United States Patent
Jung et al.

(10) Patent No.: US 10,499,375 B2
(45) Date of Patent: Dec. 3, 2019

(54) SIDELINK OPERATION METHOD OF USER EQUIPMENT IN WIRELESS COMMUNICATION SYSTEM, AND USER EQUIPMENT USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,313

(22) PCT Filed: Sep. 19, 2016

(86) PCT No.: PCT/KR2016/010411
§ 371 (c)(1),
(2) Date: Mar. 15, 2018

(87) PCT Pub. No.: WO2017/048095
PCT Pub. Date: Mar. 23, 2017

(65) Prior Publication Data
US 2018/0263019 A1 Sep. 13, 2018

Related U.S. Application Data

(60) Provisional application No. 62/219,146, filed on Sep. 16, 2015.

(51) Int. Cl.
*H04W 72/04* (2009.01)
*H04W 48/02* (2009.01)
*H04W 76/14* (2018.01)

(52) U.S. Cl.
CPC ........... *H04W 72/04* (2013.01); *H04W 48/02* (2013.01); *H04W 72/0453* (2013.01); *H04W 76/14* (2018.02)

(58) Field of Classification Search
CPC . H04W 48/02; H04W 72/04; H04W 72/0453; H04W 76/14
(Continued)

(56) References Cited

U.S. PATENT DOCUMENTS

2015/0215903 A1* 7/2015 Zhao ................. H04W 72/04
370/329
2017/0041773 A1* 2/2017 Fujishiro .............. H04W 8/005
(Continued)

FOREIGN PATENT DOCUMENTS

WO 2015065109 5/2015

OTHER PUBLICATIONS

3GPP TS 36.304 V8.5.0, Mar. 2009.
(Continued)

*Primary Examiner* — Stephen J Clawson
(74) *Attorney, Agent, or Firm* — Dentons US LLP

(57) ABSTRACT

Provided are a sidelink operation method of a user equipment (UE) in a wireless communication system, and a UE that uses the method. The method comprises: transmitting a sidelink gap request to a serving cell; receiving, from the serving cell, a message for setting a plurality of sidelink gap patterns in response to the sidelink gap request; and receiving, from the serving cell, information for activating a predetermined sidelink gap pattern from among the plurality of sidelink gap patterns.

14 Claims, 18 Drawing Sheets

(58) Field of Classification Search
USPC .......................................................... 370/329
See application file for complete search history.

(56) References Cited

U.S. PATENT DOCUMENTS

2017/0127405 A1* 5/2017 Agiwal ................. H04W 76/14
2017/0353819 A1* 12/2017 Yin ........................ H04L 47/30
2018/0167988 A1* 6/2018 Jung ..................... H04W 72/04
2018/0302779 A1* 10/2018 Fujishiro ................ H04W 8/00

OTHER PUBLICATIONS

Samsung, "Signaling Aspects of Gap for Discovery Reception," R2-153850, 3GPP TSG RAN WG2 Meeting #91, Beijing, China, Aug. 23, 2015, see section 2, and figures 1-2.
LG Electronics Inc., "Sidelink Gap for Discovery," R2-153831, 3GPP TSG-RAN WG2 #91, Beijing, China, Aug. 15, 2015, see section 2.
Ericsson, "On D2D Gaps," R2-153595, 3GPP TSG-RAN WG2 #90, Beijing, P.R. China, Aug. 14, 2015, see section 2, and figures 1-2.

* cited by examiner

SIDELINK OPERATION METHOD OF USER EQUIPMENT IN WIRELESS COMMUNICATION SYSTEM, AND USER EQUIPMENT USING SAME

CROSS-REFERENCE TO RELATED APPLICATIONS

This application is the National Stage filing under 35 U.S.C. 371 of International Application No. PCT/KR2016/ 010411, filed on Sep. 19, 2016, which claims the benefit of U.S. Provisional Application No. 62/219,146 filed on Sep. 16, 2015, the contents of which are all hereby incorporated by reference herein in their entirety.

BACKGROUND OF THE INVENTION

Field of the Invention

The present invention related to wireless communication and, most particularly, to a sidelink operation method being performed by a user equipment in a wireless communication system and a user equipment using the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

The D2D operation may have diverse advantages in the aspect of performing signal transmission/reception between close-ranged devices. For example, a D2D device (or D2D UE) may perform data communication at a high transmission rate with low latency. Also, the D2D operation may disperse (or distribute) the traffic being concentrated to the base station, and, if the D2D UE performs the functions of a relay station, the D2D UE may also perform the function of expanding the coverage of the base station.

The D2D operation is differentiated from the operation performed between a UE and a base station (network) in a cellular link, based on the aspect of the D2D operation being performed in a link between a UE and another UE. Hereinafter, the link between UEs will be referred to as a sidelink, and the D2D operations may also be referred to as sidelink operations.

When a UE performs sidelink operations, the operations performed in the cellular link may be limited. For example, it may be difficult for a UE being equipped with only one reception chain to receive a signal according to a cellular communication in a first frequency and to receive a signal according to a cellular communication in a second frequency at the same time. In this case, it may be required to limit the cellular communication operations in the first frequency at a time point of receiving a signal according to the sidelink operations in the second frequency.

As described above, a resource in which cellular operations are being restricted in order to allow the sidelink operations to be performed may be referred to as a sidelink gap. The sidelink gap may be requested to the serving cell by the user equipment (UE). However, it will be inefficient to unconditionally request a sidelink gap without knowing whether or not the serving cell has the capability of setting up such sidelink gap.

When the UE transmits a sidelink gap request to a serving cell, it is required to determine (or define) which types of information are to be added in order to increase efficiency.

Furthermore, in case the sidelink gap is needed in a frequency other than the current serving cell, the serving cell may not know which sidelink gap is being required by the other frequency. At this point, a problem lies in the method used for allowing the serving cell to set up the sidelink gap for the other frequency to the user equipment (UE).

SUMMARY OF THE INVENTION

Technical Objects

A technical object that is to be achieved by the present invention is to provide a sidelink operation method of a user equipment in a wireless communication system and a user equipment using the same.

Technical Solutions

In one aspect, provided is a method for performing sidelink operation of a user equipment (UE) in a wireless communication system. The method includes transmitting a sidelink gap request to a serving cell, receiving a message configuring a plurality of sidelink gap patterns as a response to the sidelink gap request from the serving cell and receiving information activating a specific sidelink gap pattern, among the plurality of sidelink gap patterns, from the serving cell.

The sidelink gap request may further include information notifying a sidelink operation that is to be performed by the UE.

The sidelink operation may correspond to one of sidelink signal reception and sidelink signal transmission.

The sidelink gap request may further include a list indicating frequencies that require configuration of a sidelink gap.

The sidelink gap request may include type information indicating a type of a sidelink gap. The type information may indicate whether the sidelink gap is designated for a sidelink operation in an intra-frequency, whether the sidelink gap is designated for a sidelink operation in an inter-frequency, or whether the sidelink gap is designated for a sidelink operation in an intra-frequency and an inter-frequency.

When a command instructing acquisition of sidelink gap information corresponding to a neighboring cell is received from the serving cell, sidelink gap information of the neighboring cell may be acquired.

The command may configure a gap section for acquiring the sidelink gap information corresponding to the neighboring cell.

The sidelink gap information acquired from the neighboring cell may be reported to the serving cell.

The sidelink gap request may be transmitted to the serving cell only in a case where capability information allowing the serving cell to configure a sidelink gap is received from the serving cell.

When transmitting the sidelink gap request, a prohibit timer may be initiated.

While the prohibit timer is being operated, another sidelink gap request may be not transmitted.

While the prohibit timer is being operated, another sidelink gap request may be allowed to be transmitted only in a case where a change in the sidelink gap request occurs.

A sidelink operation may be performed in a subframe corresponding to the specific sidelink gap pattern.

A cellular operation with a serving cell being configured to the UE may be limited in a subframe corresponding to the specific sidelink gap pattern.

In another aspect, provided is a user equipment. The user equipment includes a radio frequency (RF) unit transmitting and receiving radio signals and a processor being operatively connected to the RF unit. The processor is configured to transmit a sidelink gap request to a serving cell, to receive a message configuring a plurality of sidelink gap patterns as a response to the sidelink gap request from the serving cell, and to receive information activating a specific sidelink gap pattern, among the plurality of sidelink gap patterns, from the serving cell.

According to the present invention, a plurality of sidelink gap patterns may be set up to the user equipment (UE), and, among the plurality of sidelink gap patterns, a specific sidelink gap pattern may be dynamically activated or deactivated. This is more advantageous for optimization as compared to setting up only one sidelink gap pattern. Additionally, a serving cell may indicate (or instruct) acquisition and reporting of sidelink gap information corresponding to a neighboring cell of a frequency other than the serving frequency to the UE. And, the serving cell may set up a sidelink gap corresponding to the other frequency to the UE. Thus, the serving cell is capable of controlling the sidelink gap set-up (or configuration) for both the serving frequency and the other frequency.

DESCRIPTION OF EXEMPLARY EMBODIMENTS

Figure 1:
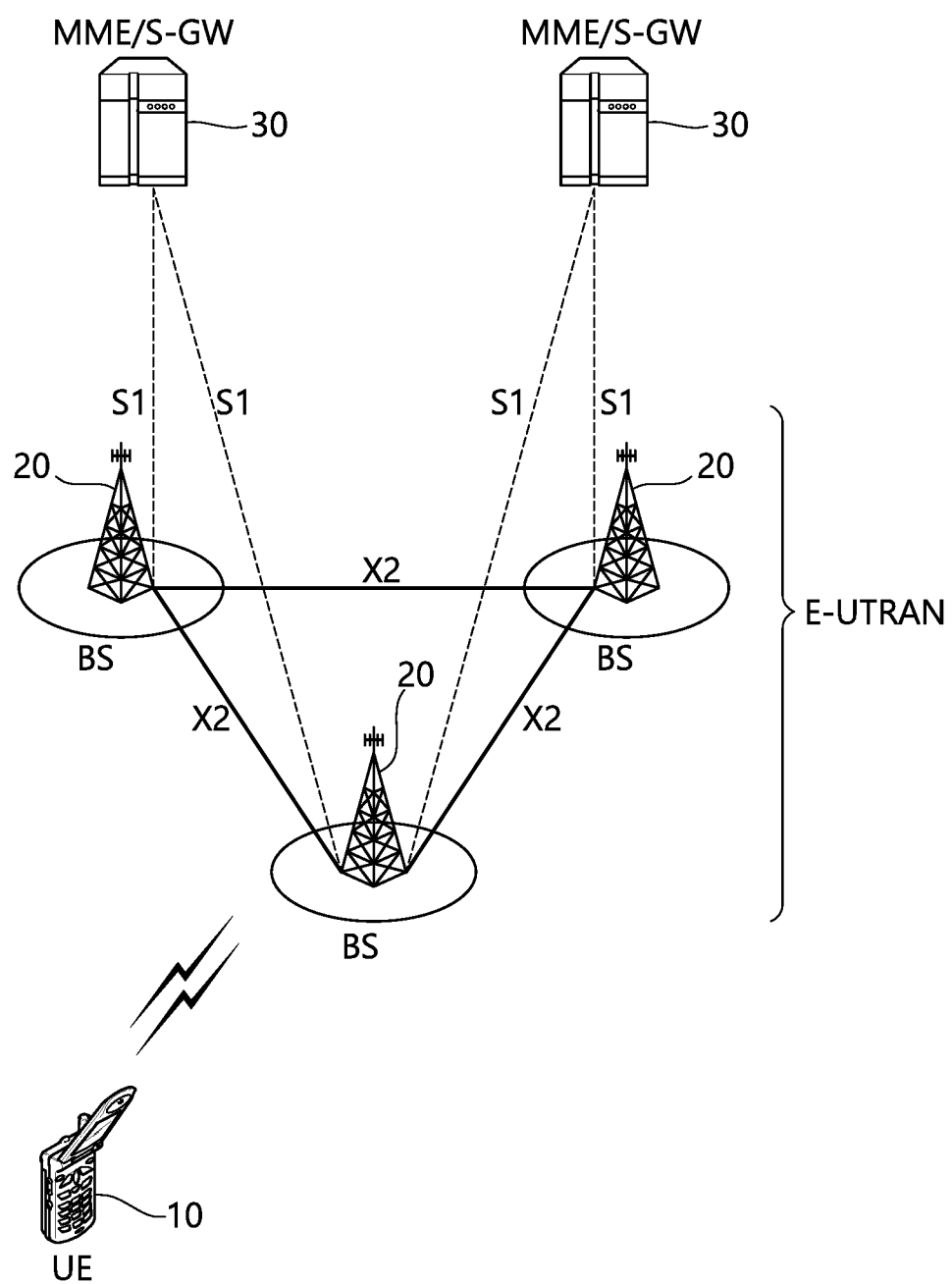
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
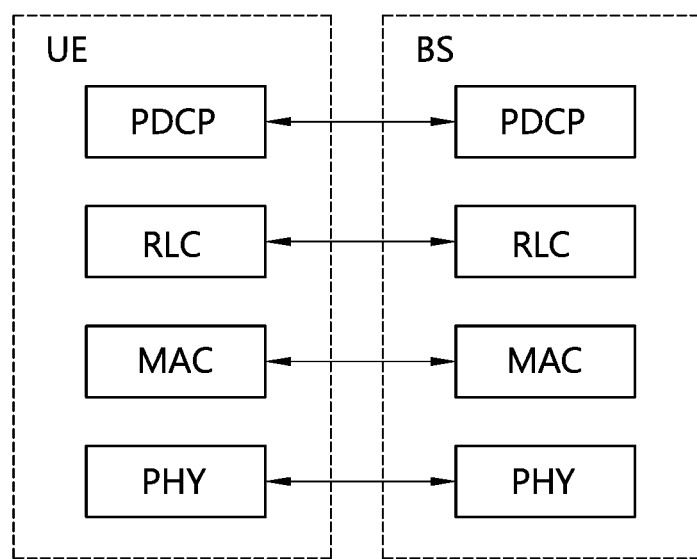
FIG. 2 is a diagram showing a wireless protocol architecture for a user plane.
Figure 3:
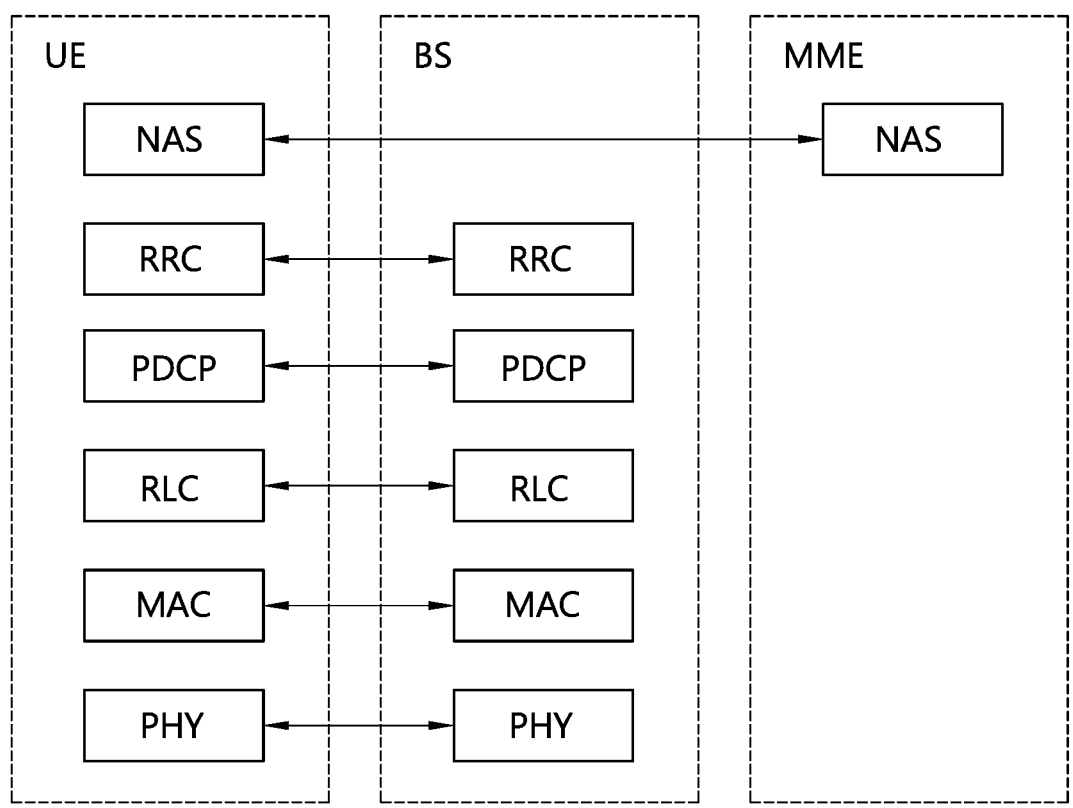
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
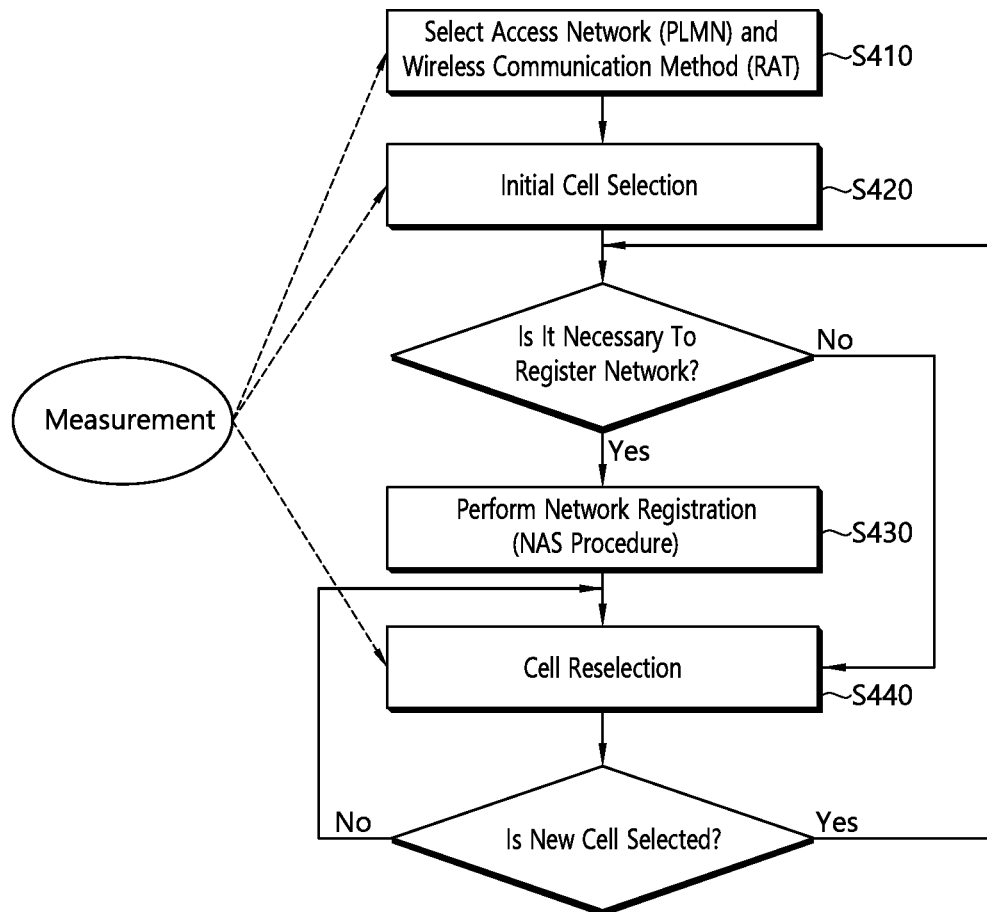
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
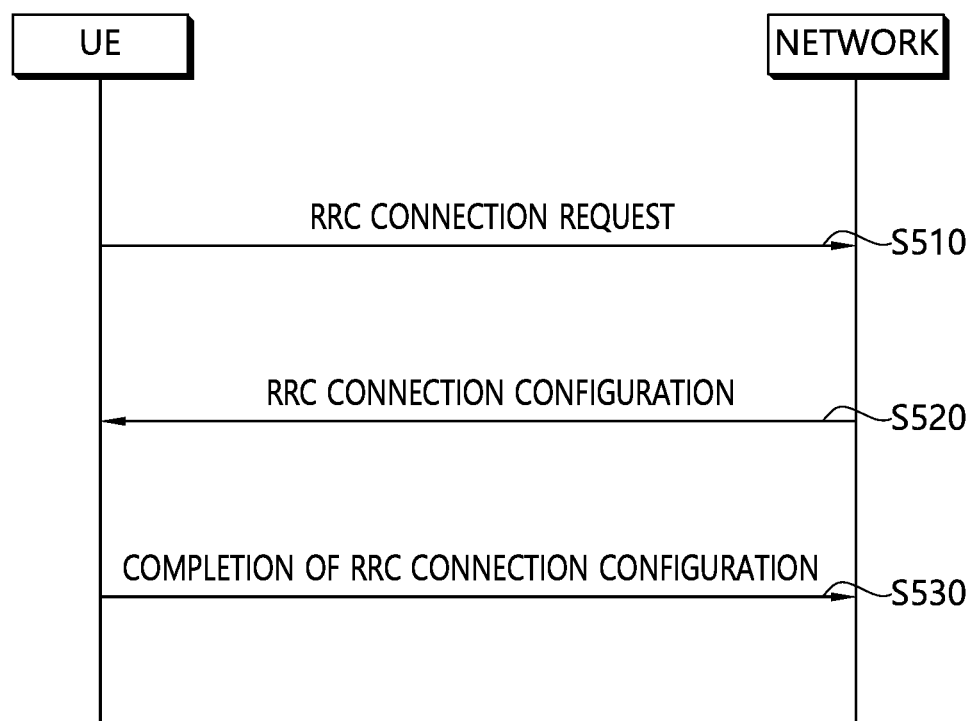
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
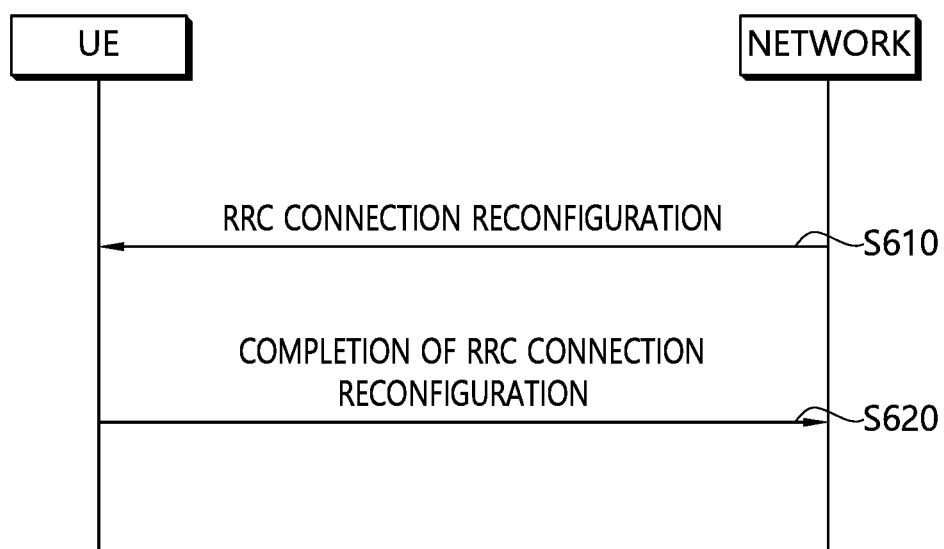
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0$$

where:

$$Srxlev = Q_{rxlevmeas} - (Q_{rxlevmin} + Q_{rxlevminoffset}) - P\text{compensation}$$

$$Squal = Q_{qualmeas} - (Q_{qualmin} + Q_{qualminoffset}) \quad [\text{Equation 1}]$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |

TABLE 1-continued

| | |
|---|---|
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$ may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Q_{meas,s} + Q_{hyst}, Rn = Q_{meas,s} - Q_{offset}$$ [Equation 2]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
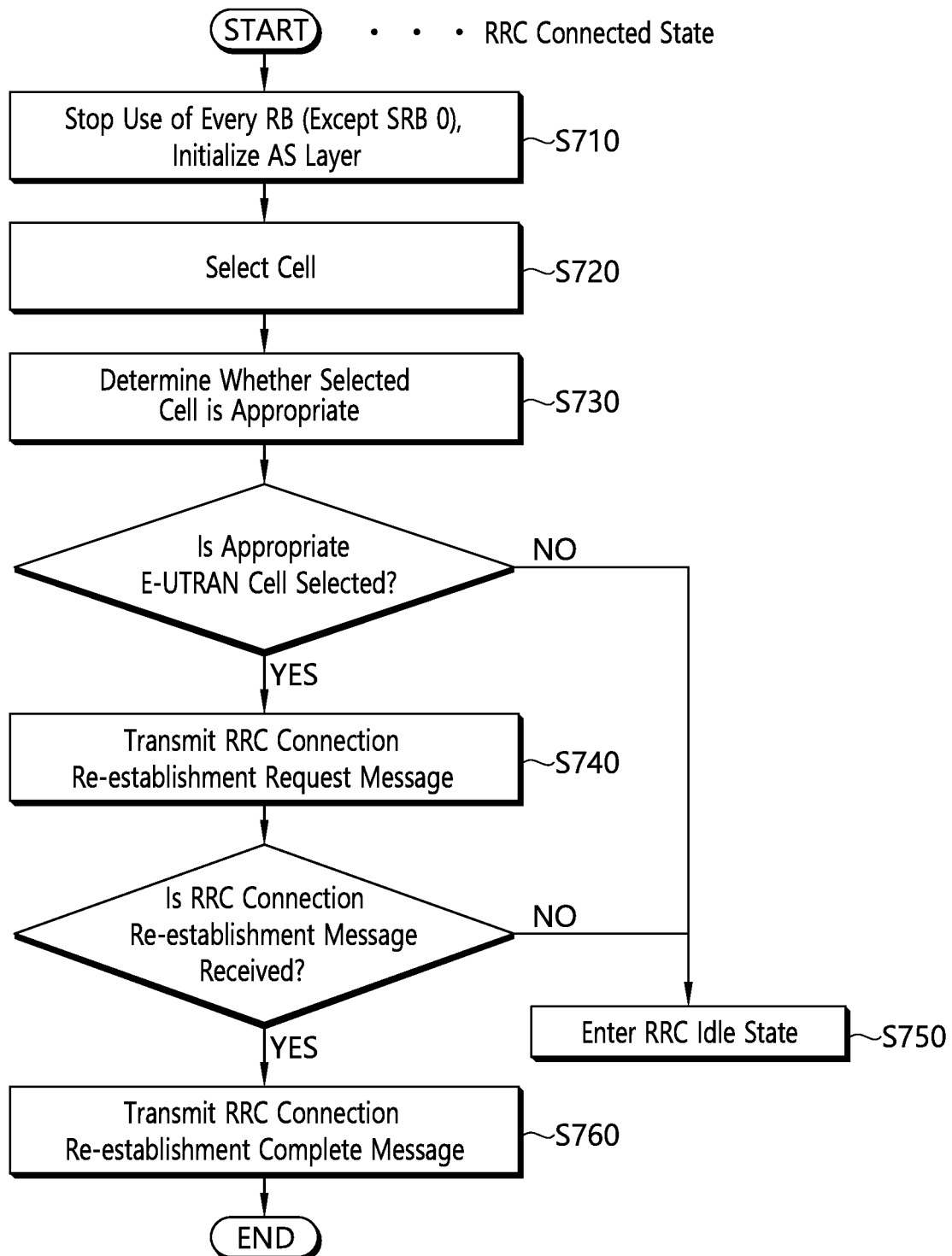
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
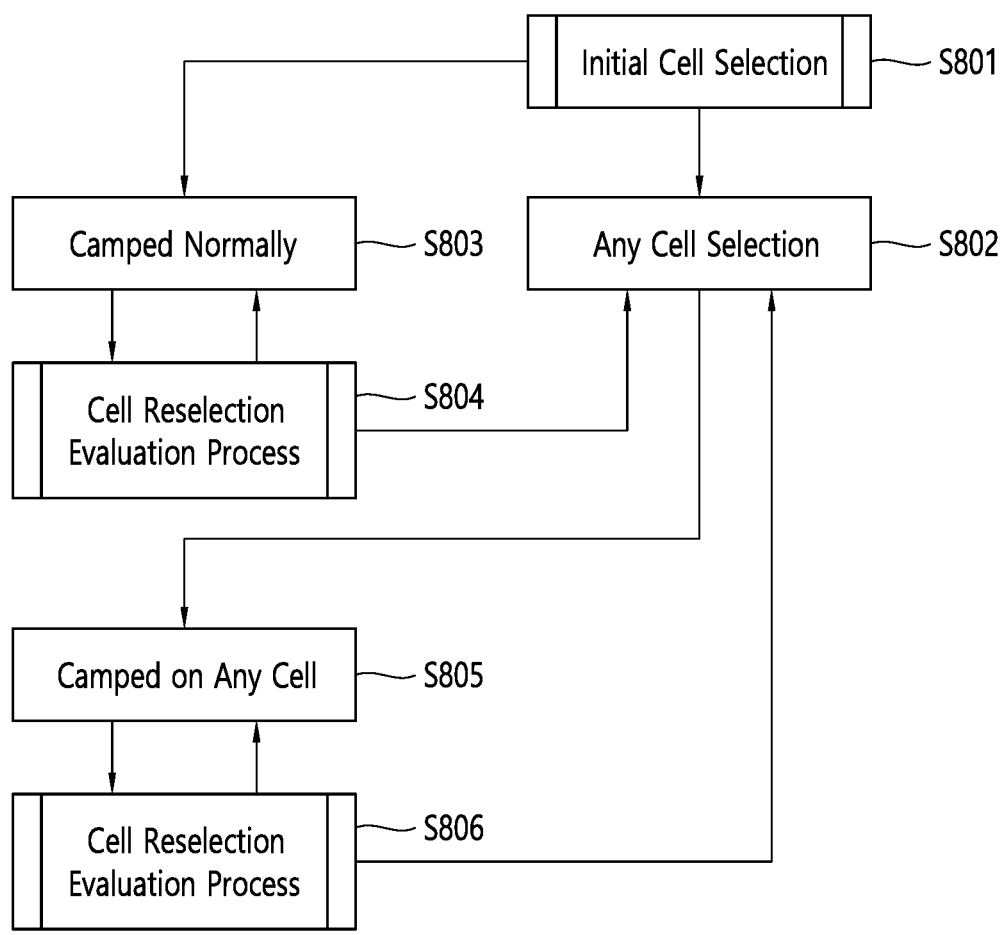
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
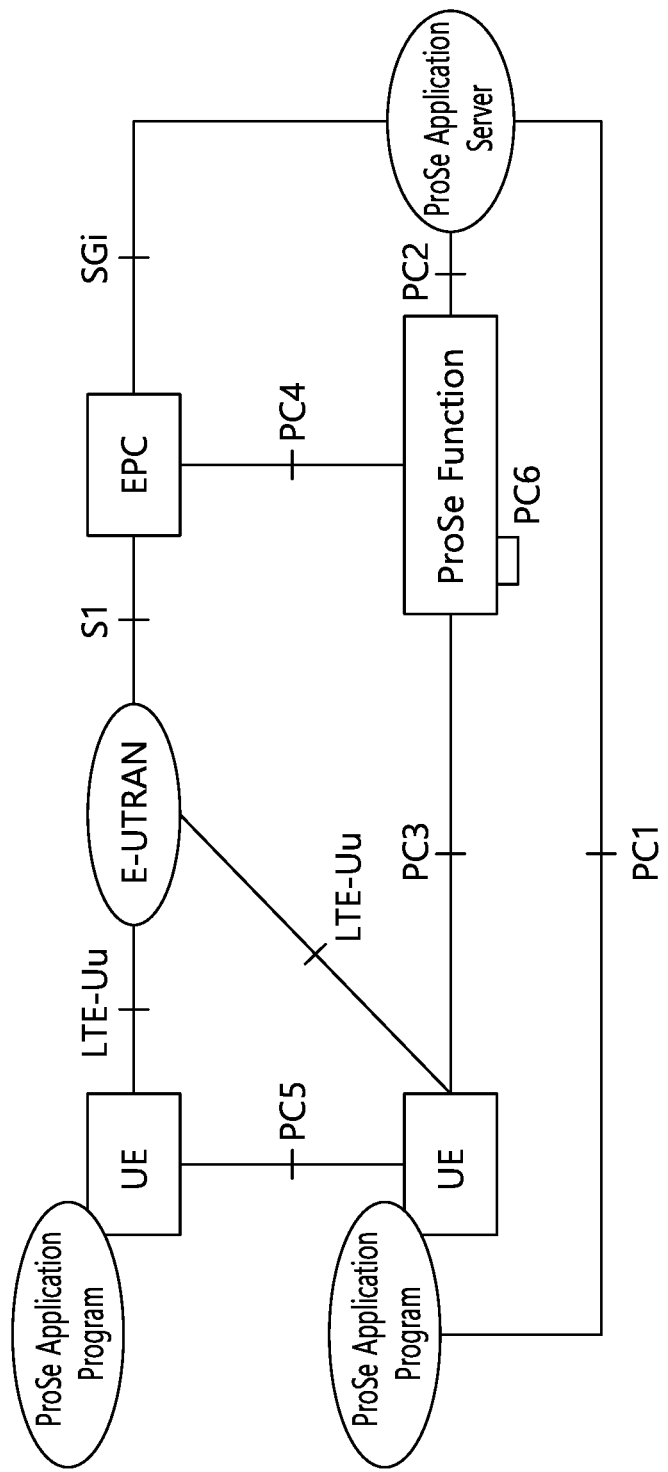
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
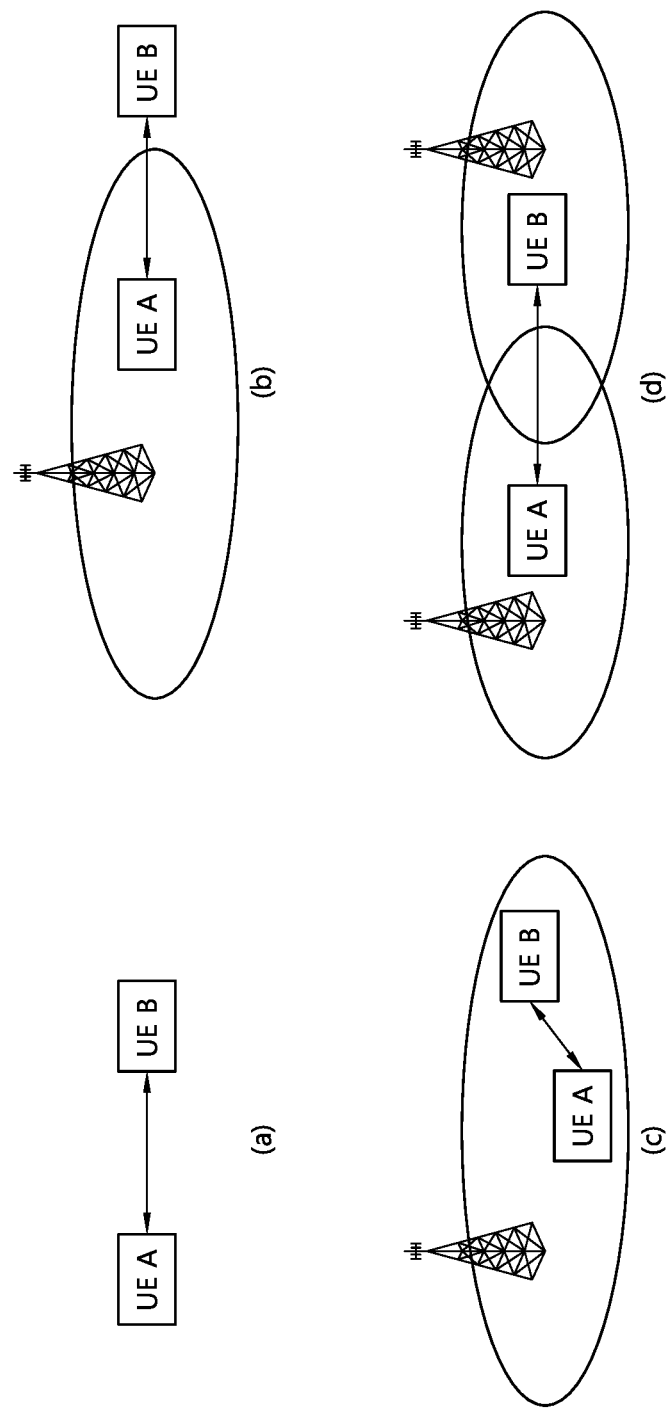
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
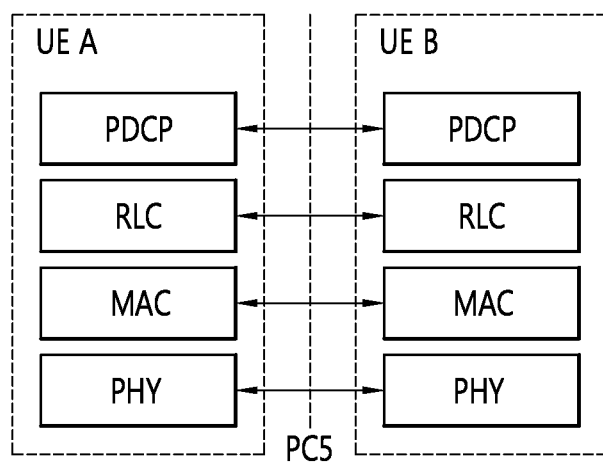
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
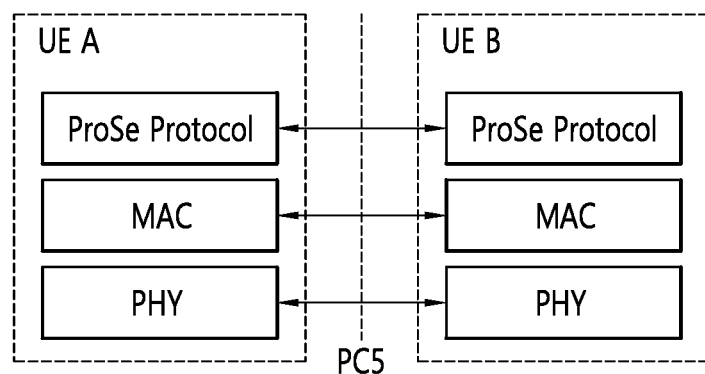
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
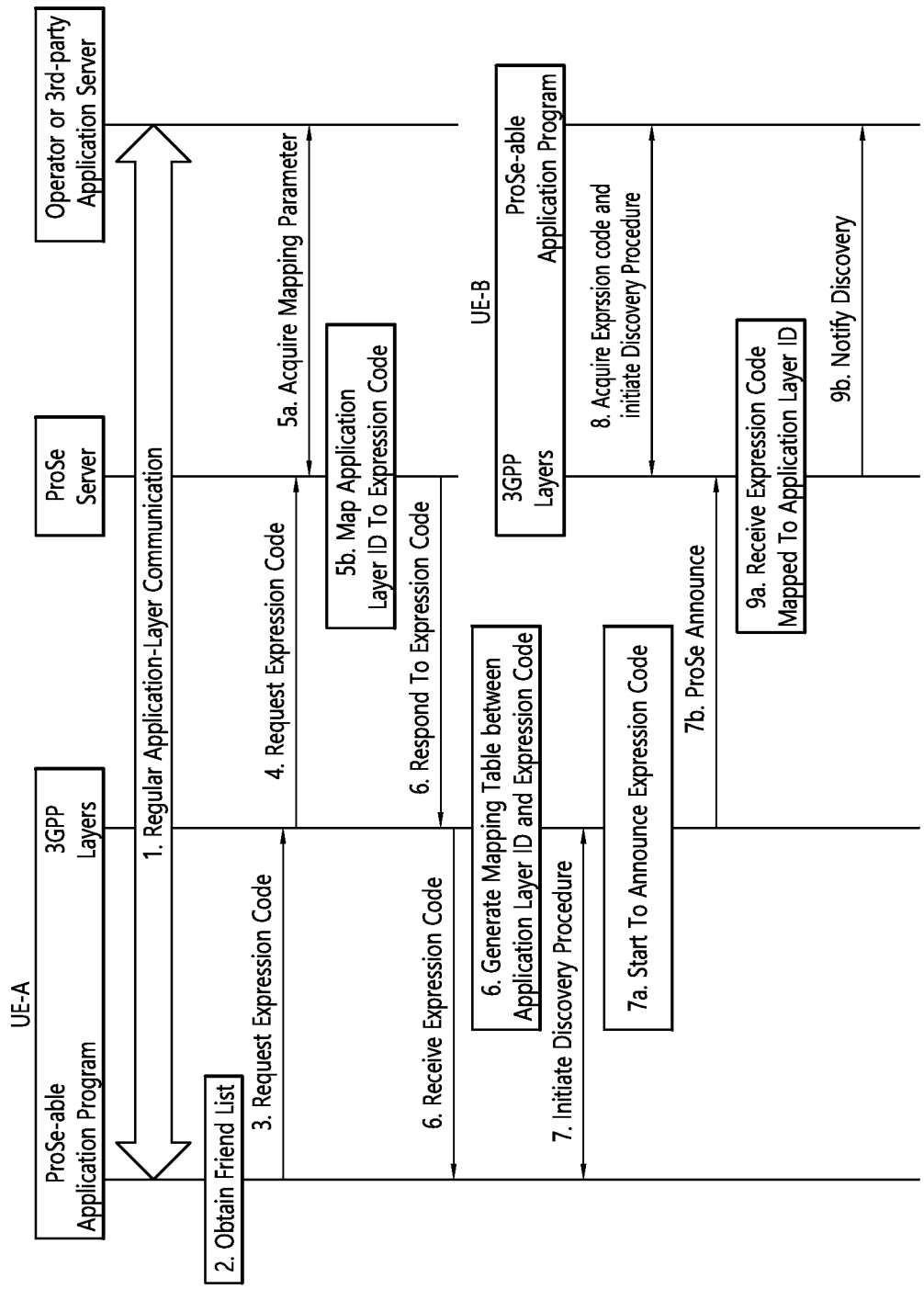
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
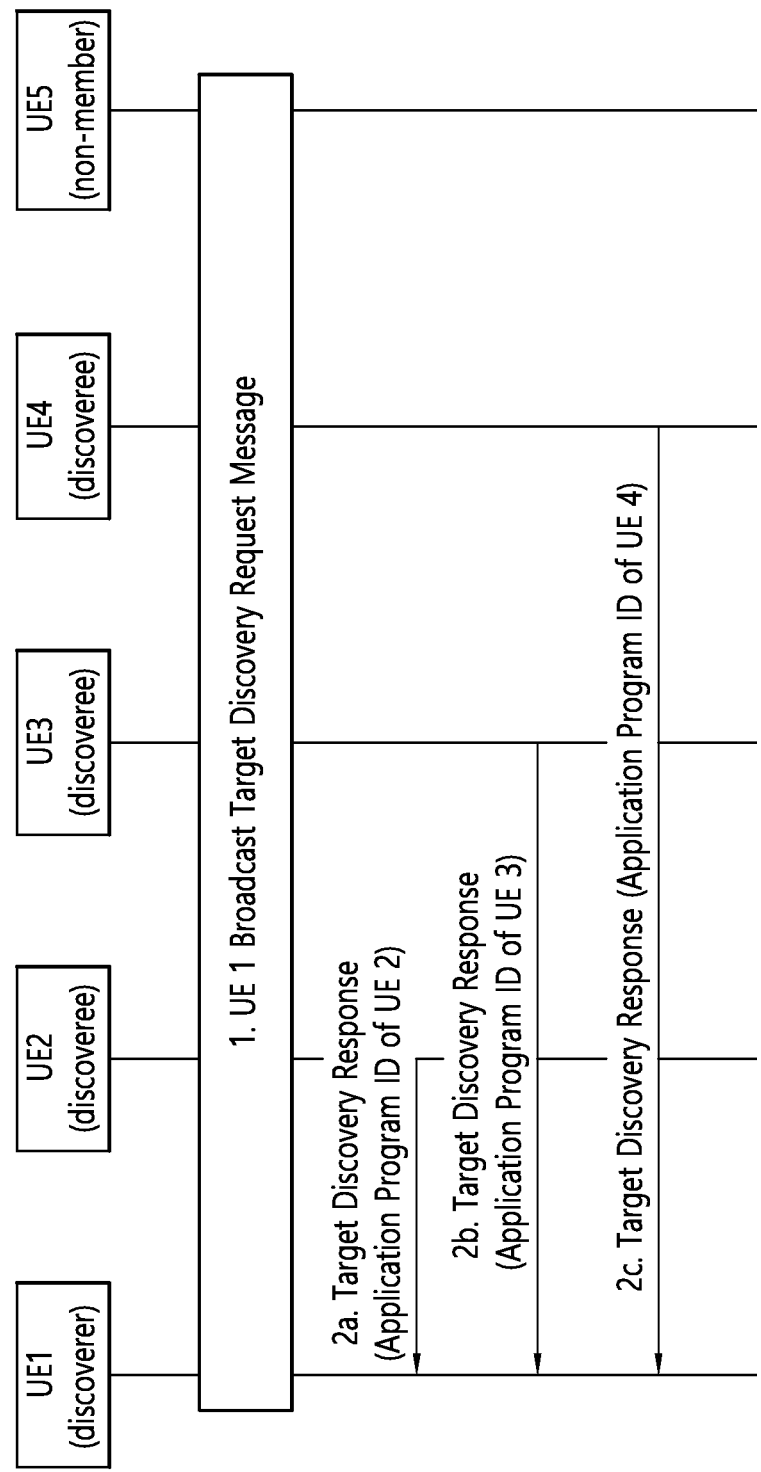
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Hereinafter, the present invention will be described in detail.

A user equipment (UE) operating in frequency division duplex FDD) may use an FDD carrier. The FDD carrier includes a downlink (DL) carrier being used in a downlink from a base station (network) to the UE and an uplink (UL) carrier being used in an uplink from the UE to the base station, and the DL carrier and the UL carrier may each correspond to a different frequency.

The UE may receive a downlink signal through a general cellular communication through the DL carrier, and the UE may receive a signal according to the D2D operation (e.g., a D2D discovery signal transmitted from another UE) through the UL carrier.

When a resource pool from which the UE may receive the D2D discovery signal is referred to as a D2D discovery resource pool, the D2D discovery resource pool may be set up (or configured) by the network. The D2D discovery resource pool may be indicated through a signal being broadcasted by the network or a UE-specific signal for a specific UE. In case the UE is equipped with only one receiving unit (or receiver), for the purpose of ensuring the D2D receiving performance, while the UE receives the D2D discovery signal from the subframes (of the UL carrier) belonging to the D2D discovery resource pool, the reading of downlink signals that are not related to the performance of the D2D operation may not be expected to be performed in the DL carrier, which is connected to the UL carrier. More specifically, the reading of downlink signals that are not related to the performance of the D2D operation may not be expected to be performed in the subframes belonging to the D2D discovery resource pool, a subframe positioned immediately before the subframes, and a subframe positioned immediately after the subframes. Furthermore, the reception of downlink signals that are not related to the performance of the D2D operation may not be expected to be performed even in a subframe that is being used for receiving a D2D synchronization signal, which is required for performing D2D receiving operations.

As a more general description, when a UE being equipped with only one receiving unit is performing a general cellular communication within the network in a f1 frequency, the UE may then receive a D2D signal in a f2 frequency. If the UE intends to monitor the D2D signal in the f2 frequency, during the monitoring period, the UE becomes incapable of performing monitoring/measurement of the downlink signal of the cellular communication in f1. In this aspect, the resource through which the UE is required to monitor the D2D signal in the f2 frequency is similar to a measurement gap in the cellular communication.

Similarly, transmitting a signal according to a cellular communication may be limited in a subframe from which the UE is required to transmit a D2D signal. The network may control the limitations in the transmission of the signal according to the cellular communication in the subframe from which the D2D signal is to be transmitted through scheduling using an uplink (UL) grant.

Hereinafter, the D2D signal may be referred to as a sidelink signal. A resource in which operations that are not related to D2D transmission/reception, i.e., operations according to the cellular communication, which are performed in order to transmit or receive a sidelink signal (e.g., D2D discovery signal or signal according to the D2D communication), are limited may be referred to as a sidelink gap or may be simply referred to as a gap. For example, in a subframe corresponding to the sidelink gap, the UE may perform sidelink operations at a higher priority, and, accordingly, operations for a general cellular communication, e.g., monitoring/measurement of downlink signals being related to the cellular communication and uplink communication, may not be performed.

As described above, if the sidelink gap is set up in order to prioritize the D2D transmission, the corresponding sidelink gap may be referred to as a D2D transmission dedicated sidelink gap, and, if the sidelink gap is set up in order to prioritize the D2D reception, the corresponding sidelink gap may be referred to as a D2D reception dedicated sidelink gap. The base station may set up each of a D2D transmission dedicated sidelink gap and/or a D2D reception dedicated sidelink gap for the UE. Alternatively, the base station may also set up a D2D transmission/reception sidelink gap that can be used in both D2D transmission and D2D reception for the UE.

Depending upon the base station, the base station may or may not have the capability to set up a sidelink gap for the UE. When a UE requests a sidelink gap set-up to a base station, which is incapable of providing gap set-up due to a lack of sidelink gap support capability, this leads to a waste of unnecessary resource. In order to prevent such waste of resource, the UE should be aware of whether or not a sidelink gap request is authorized.

If the network does not explicitly indicate that it is capable of supporting sidelink gap configuration (or set-up), there may be no means for the UE to infer (or determine) the network's capability. Therefore, the present invention proposes a method of adopting a signal that explicitly indicates the capability of the network.

Figure 15:
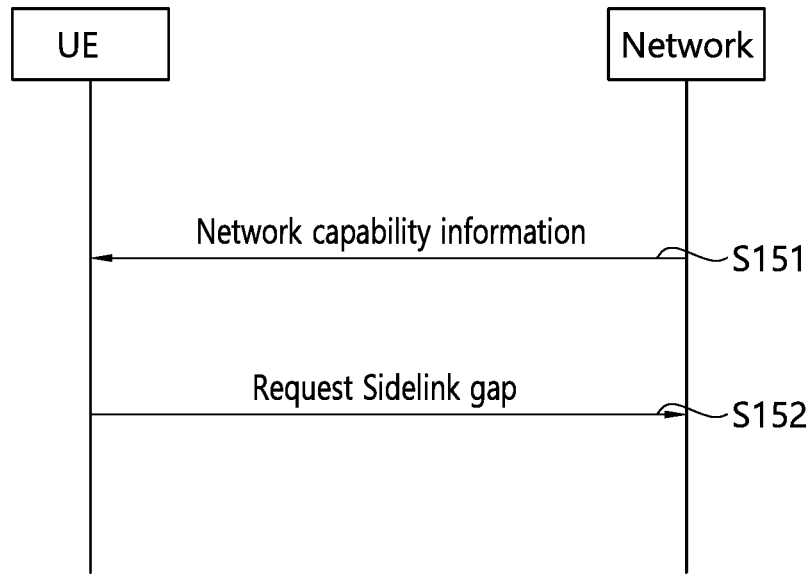
FIG. 15 illustrates operations of a network and a UE according to an exemplary embodiment of the present invention.

FIG. 15 illustrates operations of a network and a UE according to an exemplary embodiment of the present invention.

Referring to FIG. 15, the network (base station) provides network capability information to the UE (S151).

The network capability information may include information indicating whether or not the network (base station) is equipped with a capability to support a sidelink gap (or a sidelink gap support capability) or information indicating whether or not a sidelink gap request made by the UE is authorized. For example, an explicit flag (1 bit) may indicate whether or not the network (base station) is equipped with a sidelink gap support capability (or whether or not a sidelink gap request made by the UE is authorized). It may be preferable to transmit the network capability information as a signal dedicated to a specific UE rather than to broadcast the network capability information. The network capability information may be used for controlling a sidelink gap request, which is included in a sidelink UE information message.

The UE may request a sidelink gap to the base station only in a case when the base station supports sidelink gap (or in a case when a sidelink gap request made by the UE is authorized) (S152).

The base station (network) may set up a sidelink gap to the UE based on any one of the two options described below.

<Option 1> One sidelink gap pattern may be set up to the UE.

<Option 2> One or more sidelink gap patterns may be set up to the UE. More specifically, it may be authorized to set up a plurality of sidelink gaps to the UE.

In case of using Option 1, the UE may notify the network of one or more frequencies being interested in the discovery operation along with the gap request information. Accordingly, the network sets up to the UE one sidelink gap that is optimized to the frequency, which is indicated by the UE. If the UE performs the discovery operation in only one frequency, using Option 1 shall be sufficient.

However, in order to optimize sidelink gaps for the discovery operation in a plurality of frequencies being interested in the discovery operation, using only Option 1 may be insufficient. In Option 1, since only one sidelink gap being set up for the discovery operation is used by one or more frequencies, there may be limitations in achieving optimization.

Conversely, a plurality of sidelink gap patterns may be set up by using Option 2. Each sidelink gap pattern may be optimally selected by the UE for a frequency being interested in the discovery operation.

After setting up a plurality of sidelink gap patterns, the network may activate or deactivate the usage of each of the set up (or configured) sidelink gap patterns. For example, the network may activate or deactivate the usage of each of the set up (or configured) sidelink gap patterns through dynamic signaling, MAC, or signaling of a physical layer. The UE cannot use deactivated gap patterns.

Figure 16:
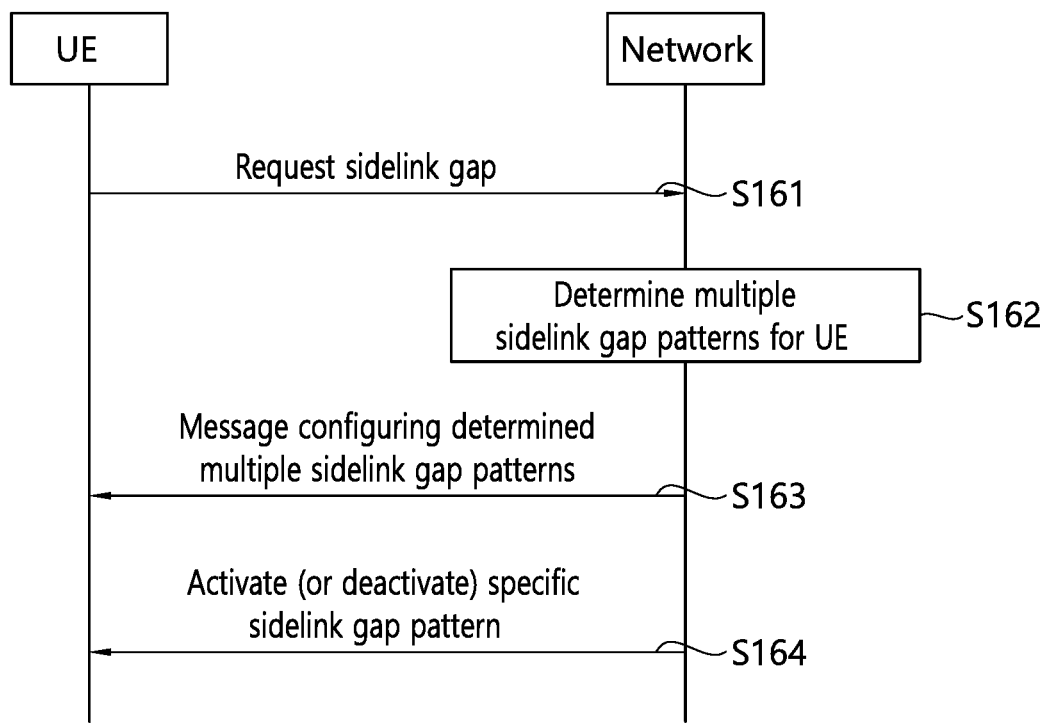
FIG. 16 illustrates operating methods of a UE and a base station that are related to the sidelink gap configuration.

FIG. 16 illustrates operating methods of a UE and a base station that are related to the sidelink gap configuration.

Referring to FIG. 16, the UE transmits a sidelink gap request to the base station (network) (S161).

The base station determines a plurality of sidelink gap patterns for the UE (S162), and, then, the base station transmits a message setting up the determined plurality of sidelink gap patterns to the UE (S163).

Among the determined plurality of sidelink gap patterns, the base station transmits a signal indicating activation (or deactivation) of a specific sidelink gap pattern to the UE (S164).

In Option 2, each of the plurality of set up sidelink gap patterns may be configured to have its own timing offset. According to Option 1, a union of sidelink subframes being interconnected to the D2D resource pool corresponding to each frequency should be set up (or configured) to the UE. As a result, in case the UE intends to perform the D2D operation in the plurality of frequencies, a large number of resources (a number of subframes) may be set up to the UE as sidelink gaps. Conversely, in Option 2, a separate sidelink gap is set up (or configured) for each frequency, and each sidelink gap may be configured to have a smaller resource size (number of subframes) as compared to Option 1.

Based on a comparison between Option 1 and Option 2, it may be determined that Option 1 is an operable solution, and that, even though Option 2 is disadvantageous for causing an increase in UE complexity, Option 2 may still be considered as an optimal solution of Option 1. Nevertheless, if the gain acquired by optimizing Option 2 is not significant, Option 1 may be used.

If the network is capable of setting up a single sidelink gap pattern to the UE, the UE may use a subframe according to the sidelink gap pattern in order to perform the D2D operation in a random frequency being interested in the D2D operation.

<Sidelink Gap Request Scenario>

In the above-described Option 1, whether or not a sidelink gap request for only one frequency made by the UE is authorized or whether or not a sidelink gap request for a plurality of frequencies made by the UE is authorized may become an issue.

If the UE is authorized to make one sidelink gap request for only one frequency, and, in case the UE is interested in the discovery operation in a plurality of frequencies, the UE performs the sidelink gap request several times, and, accordingly, the base station is required to set up a new gap to the UE each time the gap request is made. This not only leads to an unnecessary waste of radio resource but also causes D2D performance degradation because it limits variations in the frequencies. Therefore, it will be preferable to send a sidelink gap request for a plurality of frequencies through a single sidelink UE information message and to set up a plurality of gaps to the UE as needed.

More specifically, when the UE requests a sidelink gap, the sidelink gap may be designated to perform the D2D operation in one or more frequencies.

The UE may not be configured to have resource set-up (or configuration) (e.g., D2D pool configuration) for the sidelink operation in a frequency other than the serving frequency. The requests made may be divided into a plurality of cases as shown below in the following table depending upon whether or not the UE provides D2D frequency information to the serving base station, whether or not the UE provides detailed information on the requested gap resources, and so on.

TABLE 2

| | Information in 'SideUEInformation' message | | | |
| --- | --- | --- | --- | --- |
| Case | D2D Frequency information | Gap request | Details of requested gap resources) (Subframe info + Timing info) | Remark |
| 1 | Absent | Intra frequency gap | Absent | Gap request for intra-frequency D2D operation |
| 2 | Present | Inter-frequency gap | Present | Gap request for inter-frequency D2D operation with details of requested gap resources |

TABLE 2-continued

| | | | Details of requested gap resources) (Subframe info + Timing info) | |
|---|---|---|---|---|
| Case | D2D Frequency information | Gap request | | Remark |
| 3 | Present | Inter-frequency gap | Absent | Gap request for inter-frequency D2D operation without details of requested gap resources |
| 4 | Present | Intra and Inter-frequency gap | Absent | Gap request for intra & inter-frequency D2D operation without details of requested gap resources |

In order to described Table 2, which is presented above, it will be assumed that the D2D operation corresponds to D2D discovery. In Case 1 of Table 2, the UE requests a sidelink gap for an intra-frequency discovery. More specifically, the UE requests a sidelink gap for a discovery operation that is intended to be performed in the current serving frequency. Therefore, the UE does not notify the serving base station of detailed information on the frequency information and sidelink gap information, which are already known by the serving base station. The serving base station may provide a sidelink gap corresponding to a discovery resource pool configuration of the current cell.

In Case 2, the UE requests a sidelink gap for an inter-frequency discovery. More specifically, the UE requests a sidelink gap for a discovery operation that is intended to be performed in a frequency other than the current serving frequency. At this point, the UE notifies the serving base station of detailed information on the information on the other frequency and the sidelink gap information in the other frequency. If the service base station has signaled the discovery resource pool configuration (or set up) corresponding to the other frequency, the UE may notify only the frequency that required the sidelink gap configuration and may not notify the detailed sidelink gap information.

In Case 3, the UE requests a sidelink gap for an inter-frequency discovery. At this point, the UE notifies the serving base station of only the information on the other frequency that is interested in the discovery operation, and the UE may not notify the detailed information on the sidelink gap resource corresponding to the other frequency. In order to control the entire sidelink gap configuration, the serving base station (network) may instruct (or command) the UE to acquire detailed information on the sidelink gap resource from a cell existing in the other frequency and to report the acquired information.

In Case 4, the UE requests a sidelink gap for an inter-frequency discovery and an intra-frequency discovery. At this point, the UE notifies the serving base station of only the information on the other frequency that is interested in the discovery operation, and the UE may not notify the detailed information on the requested sidelink gap resource. The UE assumes that it does not have the detailed sidelink gap resource information on the inter-frequency discovery. In this case, the network may set up (or configure) a limited gap to the UE, and, then, the network may instruct (or command) the UE to acquire/report the detailed information on the sidelink gap resource for the inter-frequency discovery from the limited gap.

The 4 different cases of Table 2 may be differentiated by the network. In order to do so, a gap type field may be adopted. The gap type field may notify that the sidelink gap request corresponds to one of 1) an intra-frequency sidelink gap, 2) an inter-frequency sidelink gap, and 3) an inter and intra-frequency sidelink gap.

Figure 17:
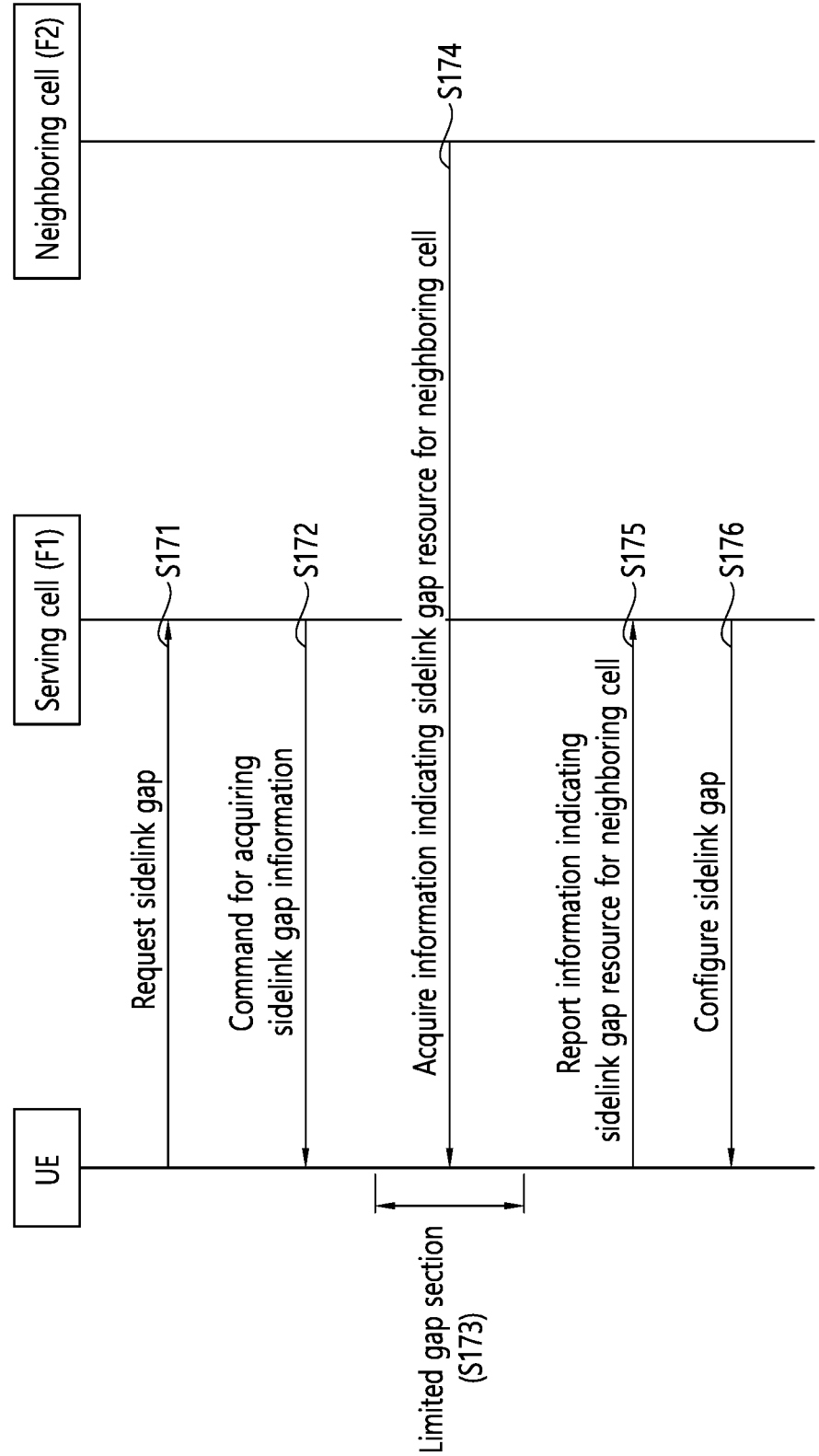
FIG. 17 illustrates operations between a UE and a serving cell for setting up a sidelink gap.

FIG. 17 illustrates operations between a UE and a serving cell for setting up a sidelink gap.

Referring to FIG. 17, the UE transmits a sidelink gap request to a serving cell (located in F1 frequency) (S171). For example, the UE may request a sidelink gap for an inter-frequency (F2 frequency) discovery. At this point, the UE may notify the serving base station of only the information on the other frequency that is interested in the discovery operation.

The serving cell transmits a sidelink gap information acquisition command to the UE (S172). For example, if the serving cell does not know the resource configuration for discovery in the F2 frequency, the serving cell may command (or instruct) the UE to acquire and report the resource configuration for discovery in the F2 frequency. In the aspect that the sidelink gap configuration corresponding to the F2 frequency can be performed by referring to the resource configuration for discovery in the F2 frequency, the resource configuration for discovery may also be referred to as information that knows the sidelink gap resource.

As described above, the UE may not know the detailed information on the sidelink gap resource, which is being requested for the inter-frequency discovery. In order to allow the network to control the overall sidelink gap configuration, the network should be capable of commanding (or instructing) the UE to acquire and report the detailed information on the sidelink gap configuration from a cell of the inter-frequency. At this point, the network may notify the UE of the frequency corresponding to the sidelink gap configuration, from which the UE is required to acquire the detailed information.

The sidelink gap information acquisition command may indicate a time section (this will be referred to as a limited gap section) during which the UE can acquire the sidelink gap information from a neighboring cell of the F2 frequency.

From the limited gap section (S173), the UE acquires information indicating the sidelink gap resource corresponding to the neighboring cell (S174).

The UE reports, to the serving cell, the information indicating the sidelink gap resource corresponding to a neighboring cell (S175). The serving cell configures the information based on a sidelink gap (S176).

Meanwhile, when the UE requests the sidelink gap, the UE may notify the serving cell whether the sidelink gap is for receiving the sidelink signal or whether the sidelink gap is for transmitting the sidelink signal.

Additionally, the UE may separately notify a list of frequencies requesting a sidelink gap. In this case, notifying the frequency for the intra-frequency sidelink gap is not required, and only the frequency for the inter-frequency sidelink gap may be notified. Through this list, the network may be capable of clearly recognizing the frequencies that are required. The network may determine whether or not to configure a limited gap for acquiring the detailed information of the sidelink gap resource.

If the UE does not support carrier aggregation, the network may provide a limited gap to the UE, and the UE may acquire detailed information on the sidelink gap resource that is being required during the limited gap section. The UE may know the sidelink gap resource (subframes and timing offset) that are being requested for the inter-frequency through SIB18, which is broadcasted by a cell of the inter-frequency.

The limited gap section may vary depending upon the number of frequencies for which the UE is interested in performing the discovery operation. Based on the number of frequencies, which is indicated by the UE through the sidelink UE information, the network may determine an adequate value of the limited gap section. The network may configure a limited gap so as to allow the UE to acquire the detailed information on the sidelink gap resource from a cell within the inter-frequency.

The UE may attempt to acquire the detailed information of the gap resource corresponding to the cell of the other frequency. If a limited gap section is configured to the UE, the UE attempts to acquire the detailed information of the gap resource during the gap section, and, then, the UE reports the acquired information to the serving cell. If the detailed information on the gap resource is acquired during the gap section, this may be immediately reported to the serving base station.

<Triggering of a Sidelink Gap Request>

If updated content exists in a message requesting a sidelink gap, the triggering of a transmission of the sidelink gap request to the serving base station should be authorized.

However, in order to prevent the sidelink gap request from being excessively transmitted, a prohibit timer may be adopted.

The prohibit timer may be initiated (or started) when a sidelink request is transmitted. While the prohibit timer is being operated, settings may be made so that the transmission of the sidelink gap request is not authorized even if a change occurs in the content of the sidelink gap request message.

Alternatively, while the prohibit timer is being operated, if a change does not occur in the content of the sidelink gap request message, the transmission of the sidelink gap request may not be authorized. More specifically, while the prohibit timer is being operated, a re-transmission of the sidelink gap request may be authorized only when a change occurs in the content of the sidelink gap request message.

When a cell that is selected by the frequency, which intends to perform the discovery operation, is changed, the prohibit timer may be stopped. Although the description presented above focuses on the discovery operation, the present invention may also be applied to the communication operation.

Figure 18:
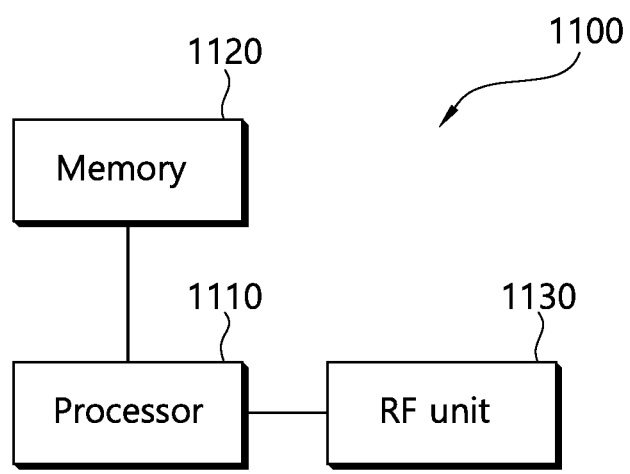
FIG. 18 is a block diagram showing a UE according to an embodiment of the present invention.

FIG. 18 is a block diagram showing a UE according to an embodiment of the present invention.

Referring to FIG. 18, a UE 1100 includes a processor 1110, a memory 1120, and radio frequency (RF) unit 1130. The processor 1110 implements the proposed functions, procedures, and/or methods.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing sidelink operation of a user equipment (UE) in a wireless communication system, comprising:
   transmitting a sidelink gap request to a serving cell;
   receiving a message configuring a plurality of sidelink gap patterns as a response to the sidelink gap request from the serving cell; and
   receiving information activating a specific sidelink gap pattern, among the plurality of sidelink gap patterns, from the serving cell,
   wherein the sidelink gap request further includes a list indicating frequencies that require configuration of a sidelink gap.

2. The method of claim 1, wherein the sidelink gap request further includes information notifying a sidelink operation that is to be performed by the UE.

3. The method of claim 2, wherein the sidelink operation is related to one of sidelink signal reception and sidelink signal transmission.

4. The method of claim 1, wherein the sidelink gap request includes type information indicating a type of a sidelink gap,
   wherein the type information indicates whether the sidelink gap is designated for a sidelink operation in an intra-frequency, whether the sidelink gap is designated for a sidelink operation in an inter-frequency, or whether the sidelink gap is designated for a sidelink operation in an intra-frequency and an inter-frequency.

5. The method of claim 1, wherein, when a command instructing acquisition of sidelink gap information related to a neighboring cell is received from the serving cell, sidelink gap information of the neighboring cell is acquired.

6. The method of claim 5, wherein the command configures a gap section for acquiring the sidelink gap information related to the neighboring cell.

7. The method of claim 5, wherein the sidelink gap information acquired from the neighboring cell is reported to the serving cell.

8. The method of claim 1, wherein the sidelink gap request is transmitted to the serving cell only in a case where capability information allowing the serving cell to configure a sidelink gap is received from the serving cell.

9. The method of claim 1, wherein, when transmitting the sidelink gap request, a prohibit timer is initiated.

10. The method of claim 9, wherein, while the prohibit timer is being operated, another sidelink gap request is not transmitted.

11. The method of claim 9, wherein, while the prohibit timer is being operated, another sidelink gap request is allowed to be transmitted only in a case where a change in the sidelink gap request occurs.

12. The method of claim 1, wherein a sidelink operation is performed in a subframe related to the specific sidelink gap pattern.

13. The method of claim 12, wherein a cellular operation with a serving cell being configured to the UE is limited in a subframe related to the specific sidelink gap pattern.

14. A user equipment, comprising:
- a transmitter and a receiver for transmitting and receiving radio signals; and
- a processor operatively coupled to the transmitter and the receiver,
- wherein the processor is configured to:
    - transmit, via the transmitter, a sidelink gap request to a serving cell,
    - receive, via the receiver, a message configuring a plurality of sidelink gap patterns as a response to the sidelink gap request from the serving cell, and
    - receive, via the receiver, information activating a specific sidelink gap pattern, among the plurality of sidelink gap patterns, from the serving cell,
    - wherein the sidelink gap request further includes a list indicating frequencies that require configuration of a sidelink gap.

\* \* \* \* \*